E. V. STODDARD.
BOMB DROPPING MECHANISM.
APPLICATION FILED JUNE 21, 1919.

1,345,276.

Patented June 29, 1920.
2 SHEETS—SHEET 1.

INVENTOR
Enoch V. Stoddard
BY
Davis & Timms
his ATTORNEYS

E. V. STODDARD.
BOMB DROPPING MECHANISM.
APPLICATION FILED JUNE 21, 1919.

1,345,276.

Patented June 29, 1920.
2 SHEETS—SHEET 2.

INVENTOR.
Enoch V. Stoddard
BY
Davis & Thomas
his ATTORNEYS.

UNITED STATES PATENT OFFICE.

ENOCH V. STODDARD, OF ROCHESTER, NEW YORK.

BOMB-DROPPING MECHANISM.

1,345,276.  Specification of Letters Patent.  Patented June 29, 1920.

Application filed June 21, 1919. Serial No. 305,867.

*To all whom it may concern:*

Be it known that I, ENOCH V. STODDARD, a citizen of the United States, and resident of Rochester, in the county of Monroe and State of New York, have invented certain new and useful Improvements in Bomb-Dropping Mechanisms, of which the following is a specification.

The present invention relates to bomb dropping mechanisms for aeronautical vehicles and it has for an object to provide a bomb dropping mechanism by which any desired number of bombs of a series may be dropped simultaneously. Another object of the invention is to control the dropping of a bomb through a sighting device preferably through a controlling means which is adjustable to correspond with the ground speed and altitude of a vehicle. Still another object of the invention is to provide means for determining the ground speed of an aeronautical vehicle.

To these and other ends, the invention consists of certain parts and combinations of parts, all of which will be hereinafter described, the novel features being pointed out in the appended claims.

Figure 1:
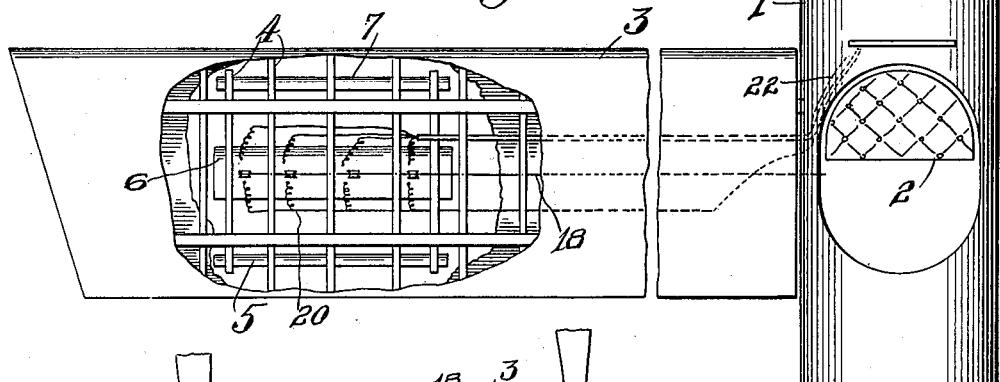
Figure 1 is a fragmentary view of an airplane equipped with the present invention.
Figure 2:
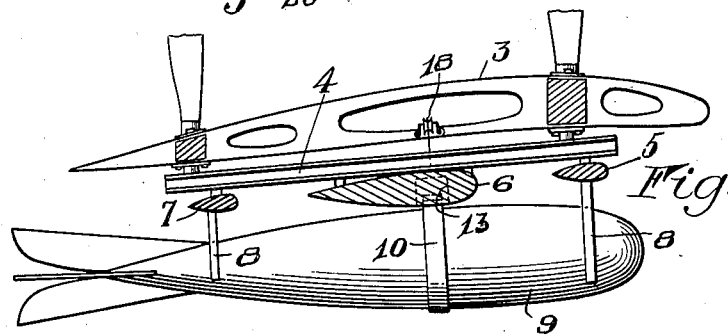
Fig. 2 is an enlarged section through one of the wings of an airplane showing one of the bombs.
Figure 3:
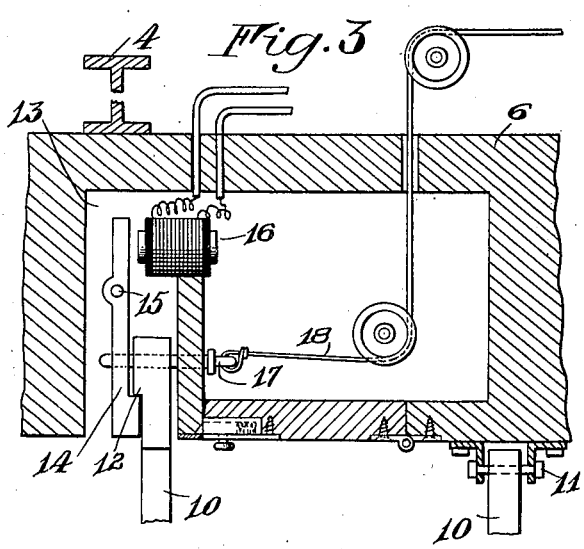
Fig. 3 is a detail view of the bomb releasing mechanism.
Figure 4:
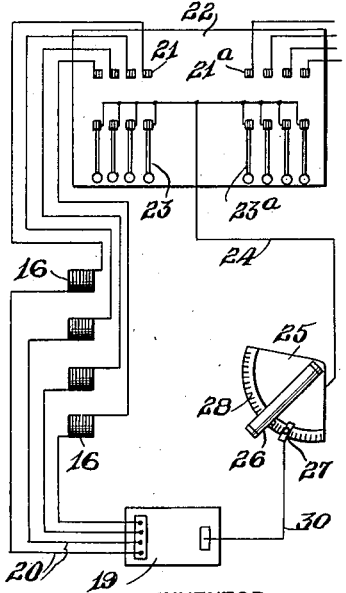
Fig. 4 shows diagrammatically the circuit by which the bomb dropping mechanism is controlled.
Figure 5:
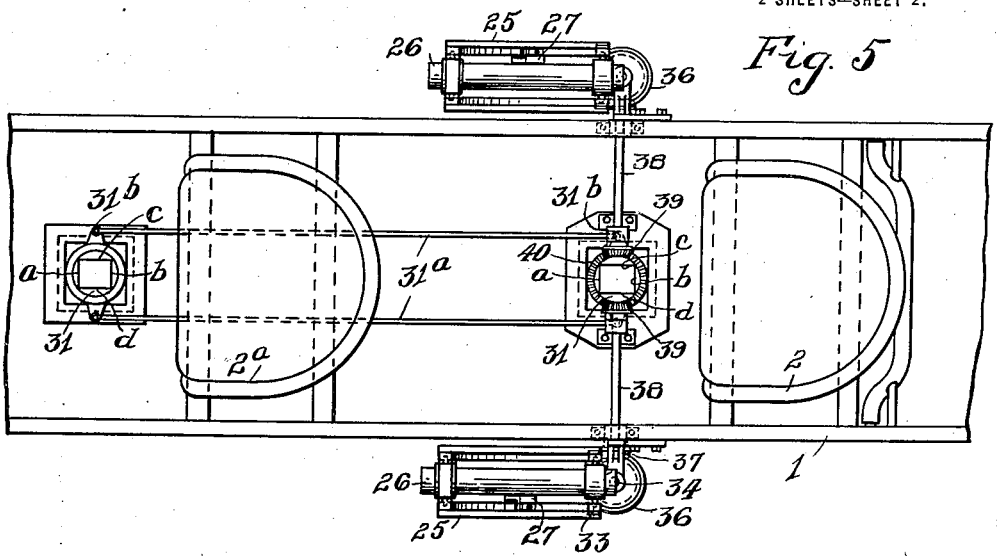
Fig. 5 is a fragmentary view of an airplane showing the sighting device and the connection between said device and the finder by which the ground speed of the vehicle is determined, parts being shown in plan.
Figure 6:
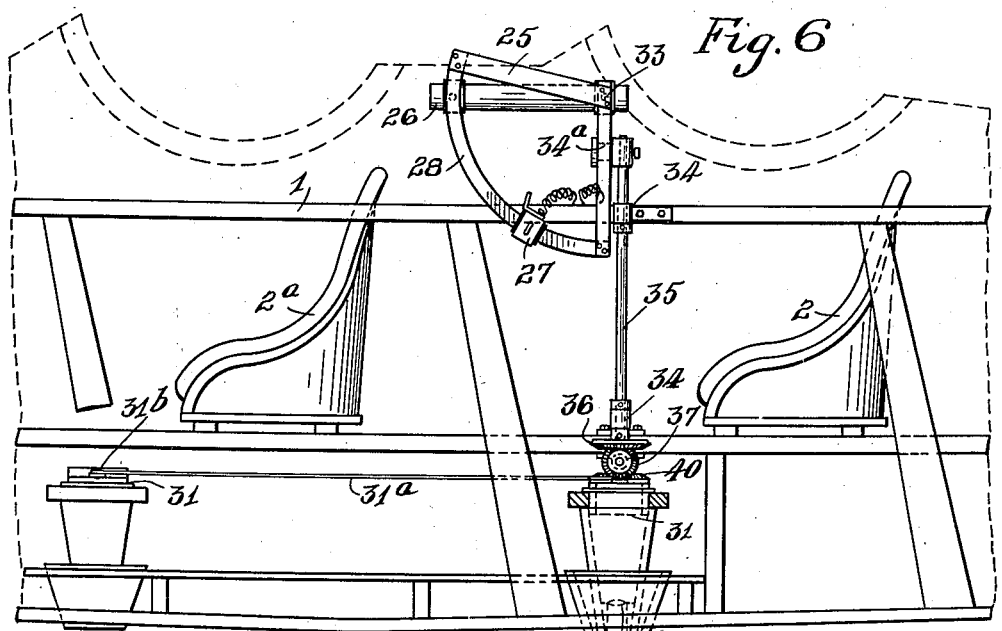
Fig. 6 shows a fragmentary view of the airplane in side elevation with the sighting and the speed determining means mounted thereon, parts being shown in section.
Figure 7:
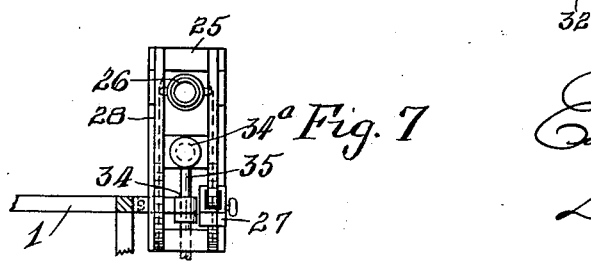
Fig. 7 is a detail front view of one of the sighting devices.

Referring more particularly to the drawings, 1 indicates the fuselage of an airplane provided with seats 2 and 2ª and 3 indicates a wing. Attached to the lower sides of the wings near the outer end of each is a bomb rack comprising in this instance steel beams 4 bolted to the wing spars and having three boards 5, 6 and 7 attached to the same, the center board 6 being broad while the outer boards 5 and 7 are narrow. The outer boards 5 and 7 carry clips 8 which steady the nose and tail of the bomb 9 while from the middle board 6, the bomb holding means depends.

The bomb holding means in this instance consists of a strap 10 secured at one end at 11 to the board 6 while its other end is provided with a shoulder 12 and fits into a recess 13 in the board, this recess also containing a pivoted detent 14 which coöperates with the shoulder 12 to hold the strap 10 about the bomb 9. The detent 14 which is pivoted at 15 is controlled through an electro-magnet 16, the energization of the magnet swinging the detent 14 on its pivot and releasing the strap 10 so that the strap permits the bomb to drop from the airplane. A safety pin 17 may be employed in connection with the strap 10 being preferably in the form of a sliding pin guided in the board 6 through an opening in the strap and also in an opening in the detent 14. This pin may be controlled in any suitable manner preferably by a lanyard 18 leading from the pin to a point adjacent the seat 2 of the vehicle.

The different detents 14 of the bomb holding means may be operated simultaneously or any desired number of said detents may be operated together. This result is preferably secured by two electrical circuits each embodying a battery 19 with conductors 20 leading therefrom to separate contacts 21 on a switch board 22, each of said conductors having one of the electro-magnets 16 included therein. The switch board 22 has a plurality of manually controllable switches 23 thereon which connect by a conductor 24 with a frame 25 of a telescopic sight 26, the latter being movable on the frame 25 and having a contact 27 arranged in its path, said contact 27 being insulated from the frame 25 but being adjustable on a segment 28 forming a part of the frame, the contact being connected by a conductor 30 with the battery 19. It is apparent that any or all of the switches 23 may be thrown into connection with the contacts 20 so that when the telescopic sight 26 is moved into engagement with the contact 27, those magnets 16 which are controlled through the closed switches 23 will be energized and cause the straps 10 controlled through said magnets to be released to drop the bombs held by the straps. The switch board 22 also contains a number of additional switches 23$^a$ which are adapted to engage with contacts 21$^a$ forming part of the other circuit which is controlled by the other telescopic sight 26. The switches 23 control those bombs on one side of the vehicle while the switches 23$^a$ control those on the opposite side of the vehicle. The scale 28 over which the controlling contact 27 of each circuit of the bomb dropping mechanism is adjustable, is empirical. In using this scale, the ground speed of the plane and its altitude are first ascertained after which reference is made to a table which will show the position on the scale for the adjustable contact.

For obtaining the ground speed of the vehicle, there is provided one or more field defining devices each preferably in the form of a screen 31 made of ground glass and having four lines, $a$, $b$, $c$ and $d$ marked thereon to define a field of rectangular formation. The lines or marks $a$ and $b$ are parallel and extend when the field defining device is in normal position, transversely of the fore and aft axis of the vehicle, while the lines $c$ and $d$ are parallel and extend, when the field defining device is in normal position, longitudinally of the fore and aft axis of the vehicle. A lens 32 of universal focus may be associated with the field defining device for the purpose of collecting the image upon the screen, thus providing a finder. This finder is rotatable about an upright axis, the purpose of this being to permit the parallel lines $c$ and $d$ to be turned so that they lie parallel with the course of travel of the plane, it being well known that a plane in many instances travels with its fore and aft axis at an angle to the line of travel. By taking the time with a stop watch of the passing of an image of an object between the lines $a$ and $b$, the ground speed of the vehicle can be calculated. There can be used in this connection a speed table which will take into consideration the altitude of the vehicle as well as the time it takes for the image to pass between the lines $a$ and $b$.

The two field defining devices are arranged in this instance, one in front of each of the seats 2 and 2$^a$ so that the occupants of each of the seats may determine the ground speed of the air plane. In order that the two finders may move simultaneously about upright axes, they are connected together by links 31$^a$ which are pivotally connected to the opposite sides of the finders at 31$^b$ so as to move in parallelism.

It is preferred to provide two sighting telescopes 26 which in addition to being mounted to turn on the frames 25 about axes 33 extending transversely of the fore and aft axis of the air plane, are also adapted to swing about horizontal axes 34$^a$ extending longitudinally of the air plane for the purpose of permitting the user of the telescope to maintain the telescope at his eye notwithstanding the side swinging or rocking of the air plane, these axes 34$^a$ being arranged between the frames 25 and the fuselage, the frames being mounted on opposite sides of the fuselage and being also pivotally connected to the fuselage to turn about axes 34. The frames 25 are both connected to the rotary viewing fields 31 so that as the frames 25 swing about the vertical axes they transmit motion to the rotary finders or field defining devices.

The connection between the telescopes and the rotary field defining devices comprises in this instance, two vertical shafts 35 turning in the bearings 34, connected with the frames 25 to turn therewith and having beveled gears 36 at their lower ends meshing with beveled gears 37 which are formed at the outer end of two horizontally arranged shafts 38, said shafts in turn having beveled gears 39 at their inner ends meshing with a crown gear 40 formed on the rear finder.

It is apparent that, as the telescopes 26 are swung about the vertical axes 34, in order to keep an object to which a plane is directed within the field of the instrument, the field defining device will be turned so that the fore and aft lines thereof will be directed parallel with the course of travel of the vehicle. Of course, as the vehicle approaches the object to be bombed, the sighting telescopes will swing downwardly about the horizontal axes 33 and on their downward courses will engage with the adjustable contacts. When this engagement takes place, those magnets 16 which connect with the closed switches 23 will be energized, thus operating the detents 14, releasing the straps 10 and permitting the bombs to drop.

From the foregoing it will be seen that with this invention the pilot may approach his target from any point, regardless of the wind and at the same time calculate with absolute accuracy the point where his bomb will fall. This calculation is done mechanically and the apparatus is equally effective at all speeds, altitudes and courses. The invention does away with the necessity of requiring the bomber to guess the right point to drop the bomb. The only work required of the bomber is to maintain the sight upon the target and to adjust the controlling means for the bomb dropping mechanism to correspond with the altitude and the ground speed of the vehicle. For night bombing where the lens is not able to give sufficient illumination, the finder may be changed for a construction which will not have this disadvantage. The bomber may drop any one or more of the bombs at one time according to his desire.

What I claim as my invention and desire to secure by Letters Patent is:

1. Means for determining the ground speed of an aeronautical vehicle comprising a viewing field rotatable about an upright axis and provided with two spaced lines extending transversely of the fore and aft axis of the vehicle combined with a sighting device mounted to swing about an upright axis and connected to the viewing field so that the latter and the sight rotate together.

2. Means for determining the ground speed of an aeronautical vehicle comprising a viewing field rotatable about an upright axis and provided with two spaced lines extending transversely of the fore and aft axis of the vehicle, combined with two sighting devices on opposite sides of the viewing field, each mounted to swing about an upright axis and connected to the viewing field so that the latter and the sighting devices turn together.

3. The combination of a viewing field rotatable about an upright axis, with a sighting device rotatable about an upright axis and connected to the viewing field so that the latter and the sighting device turn together, said sighting device being also rotatable about a horizontal axis, and a bomb holding mechanism controlled by the swinging of the sighting device about its horizontal axis.

4. The combination of a viewing field rotatable about an upright axis, with a sighting device rotatable about an upright axis and connected to the viewing field so that the latter and the sighting device turn together, said sighting device being also rotatable about a horizontal axis, a bomb holding mechanism, and a controlling device for said bomb holding mechanism controlled by the sighting device on the swinging of the latter about the horizontal axis and adjustable to correspond with the ground speed of the vehicle.

5. A bomb dropping mechanism comprising a bomb holding device, a sighting device for the vehicle mounted to swing about a vertical and a horizontal axis, a controller for the bomb holding device adjustable to different positions in the path of the sighting device to correspond with the ground speed and the altitude of the vehicle, and a finder rotatable about a vertical axis and connected with the sighting device to turn about its vertical axis as the sighting device turns about its vertical axis.

6. Means for determining the ground speed of an aeronautical vehicle comprising two viewing fields rotatable about upright axes and each provided with two spaced lines extending transversely of the fore and aft axis of the vehicle, and connections between said viewing fields for causing said fields to rotate together a like amount, combined with a sighting device mounted to swing about an upright axis and connected to the viewing fields so that the latter and the sight rotate together.

7. Means for determining the ground speed of an aeronautical vehicle comprising a viewing field rotatable about an upright axis and provided with spaced lines extending transversely of the fore and aft axis of the vehicle, combined with a sighting device mounted to swing about an upright axis and connected with the viewing field so that the latter and the sight rotate together, said sight also being mounted to swing about an axis extending longitudinally of the vehicle to permit the sight to be held at the eye of the user notwithstanding the side rocking of the vehicle.

ENOCH V. STODDARD.